Nov. 2, 1954 — R. M. MERCIER — 2,693,322
REELING DEVICE WITH AUTOMATIC TORQUE REGULATION
Filed May 24, 1949 — 3 Sheets-Sheet 1

Inventor
R. M. Mercier,
By E. F. Ostenderoth
Atty

Nov. 2, 1954  R. M. MERCIER  2,693,322
REELING DEVICE WITH AUTOMATIC TORQUE REGULATION
Filed May 24, 1949  3 Sheets-Sheet 3

Inventor:
R. M. Mercier

United States Patent Office 2,693,322
Patented Nov. 2, 1954

2,693,322

REELING DEVICE WITH AUTOMATIC TORQUE REGULATION

Robert Maurice Mercier, Paris, France

Application May 24, 1949, Serial No. 95,138

Claims priority, application France May 31, 1948

3 Claims. (Cl. 242—75)

The present invention relates to an improved reeling machine comprising a frictional torque regulating device and applicable, inter alia, to the reeling under controlled tension of webs, sheets, threads or strips.

It is known that in friction torque limiters the transmitted torque has as its upper limit the torque corresponding to a function of the application pressure of the friction surfaces and the coefficient of friction of said surfaces.

As the coefficient of friction is subject to variation under the effects of lubrication, the state of wear of the surfaces and their temperature, friction torque limiters have a rather irregular operation. When they are utilised for reeling or coiling sheets, webs or thin strips which are consequently rather fragile, irregularities in the tension follow with consequent breakage of the reeled material. The present invention has for its object an improved reeling machine comprising a friction drive in which the torque transmitted by the engagement of elements of the usual form is made practically independent of the coefficient of friction of the friction surfaces. This invention also has for its object means for easily regulating the value of the torque transmitted by the friction mechanism, and in particular to vary it as a function of the radius of the reel, when the device is employed in reeling mechanism operating under constant tension. The invention is also applicable to an improved reeling machine provided with braking means and permitting a braking torque to be applied to the shaft of a reel which torque is strictly controlled and independent of the coefficient of friction of the friction linings.

Figure 1:
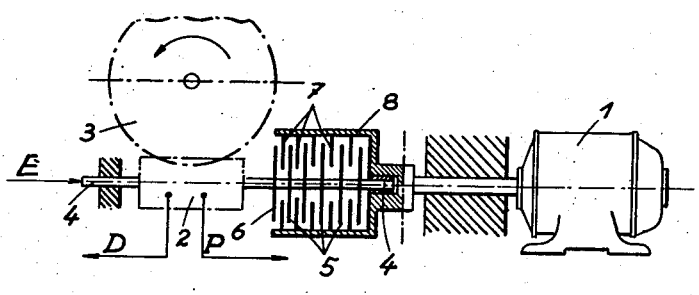
Figure 2:
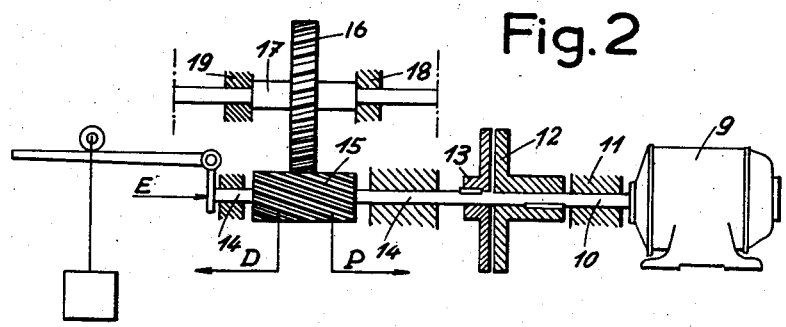
Figure 3:
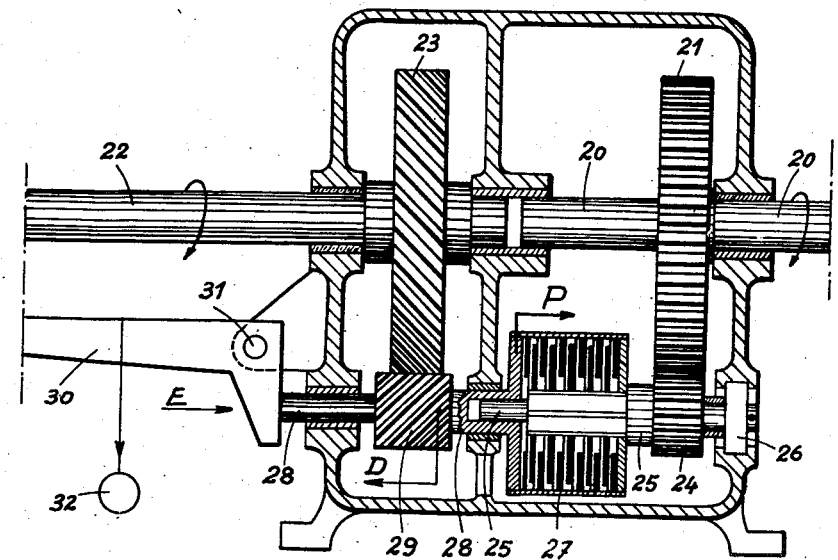
Figure 4:
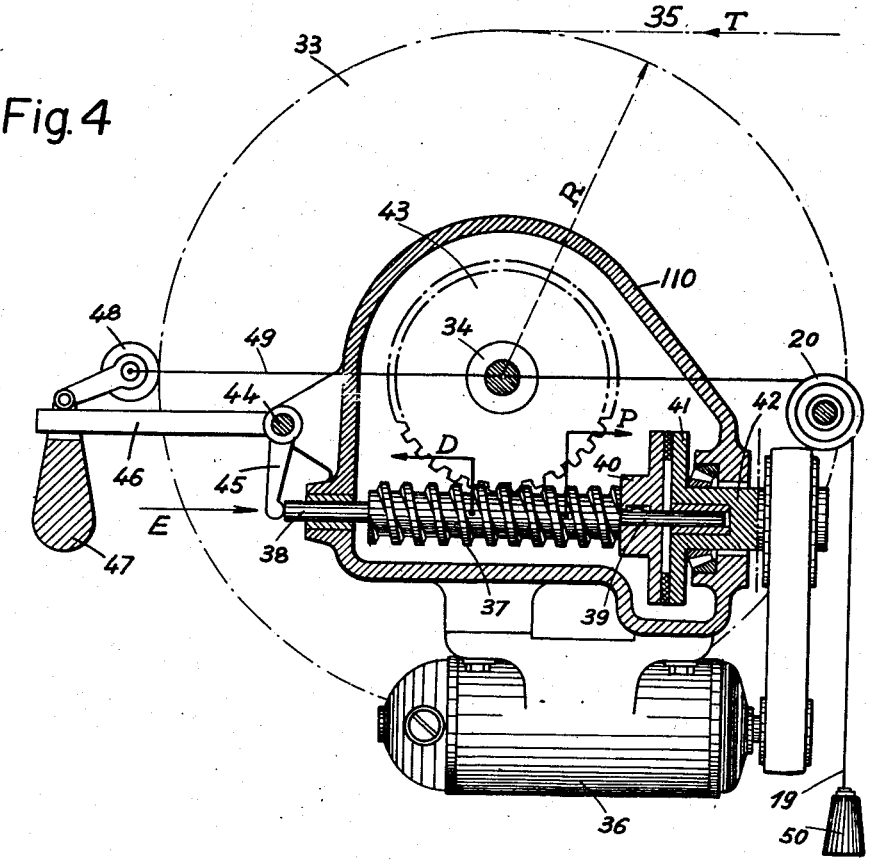
Figure 5:
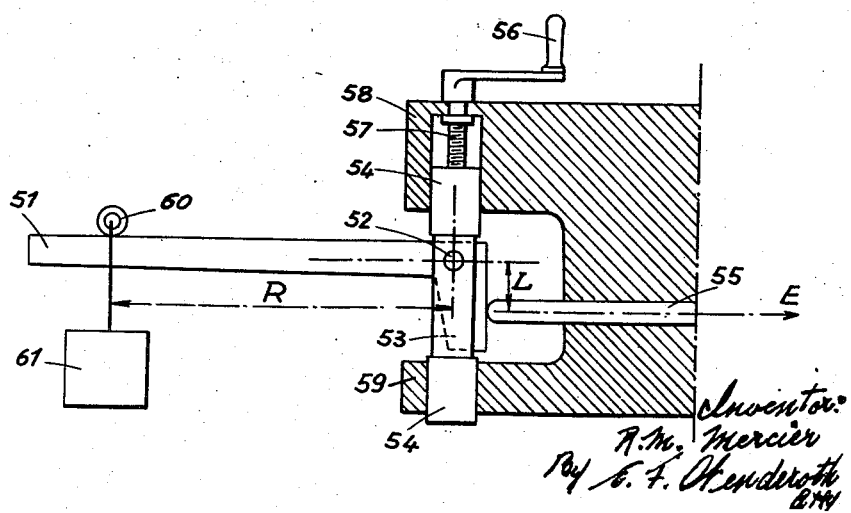
Figure 6:
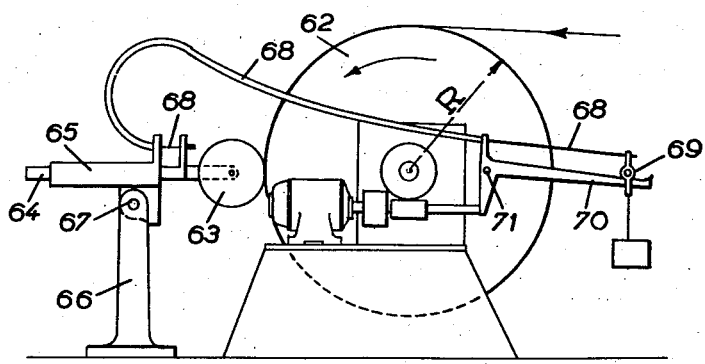
Figure 7:
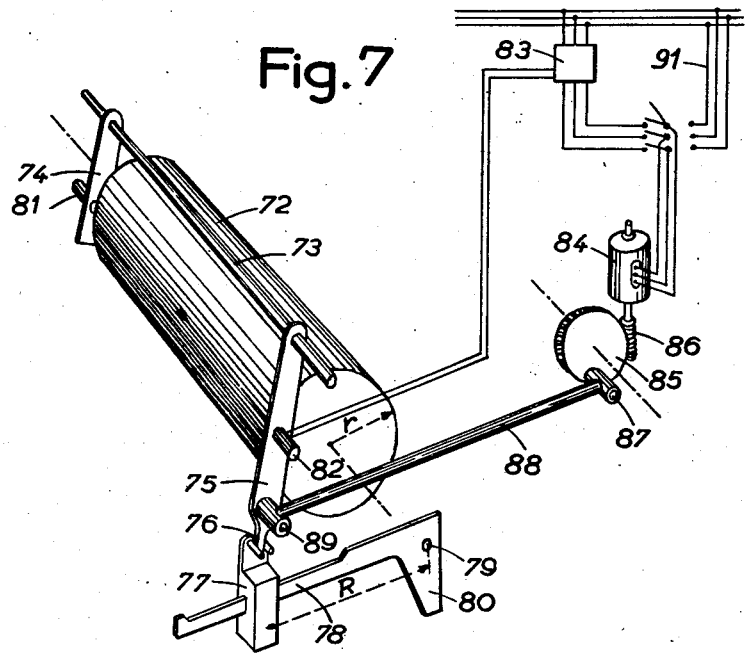
Figure 8:
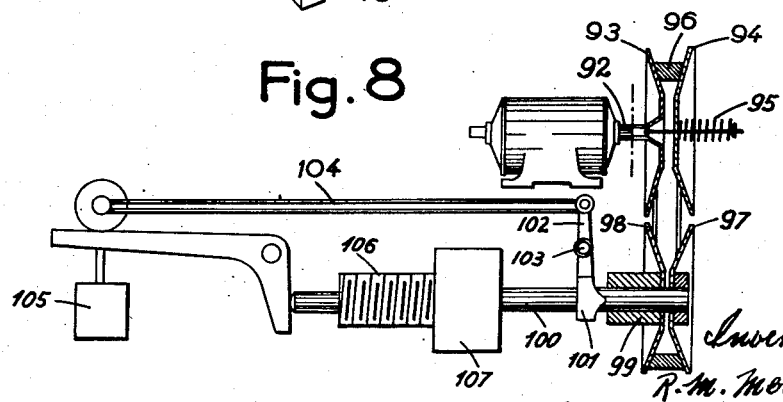

Various constructional features of devices according to the invention are shown by way of example only, on the accompanying drawings wherein:

Fig. 1 shows in diagrammatic section a torque limiting mechanism with worm drive applicable to a reeling machine, Fig. 2 shows in diagrammatic elevation a torque limiting mechanism using helical gears applicable to a reeling machine, Fig. 3 is a modification of the construction of Fig. 2, Fig. 4 shows the application of the torque limiting mechanism to a constant tension reeling device, Fig. 5 shows a device which permits the adjustment of the torque limiter to be varied rapidly, Fig. 6 shows a connecting device between the radius of coiling of a reel and the torque limiter operating the hub of the reel, Fig. 7 shows a photo-electric cell device for regulating the torque limiter as a function of the radius of the reel being produced, and Fig. 8 shows the mechanical connection between the regulating elements of a torque limiter and a speed varying device in order to reduce the frictional loss.

These drawings are only given by way of example and the devices shown thereon are not intended to limit the invention which further comprises variations and modifications possible within the scope of the appended claims.

Referring to Fig. 1 an electric motor 1 or any other power source drives a worm 2 engaging a worm wheel 3 to which the resistant torque is applied. The worm shaft 4 may rotate and slide longitudinally in its supports. This shaft is connected to the motor shaft by a friction device wherein discs 5 are keyed to the shaft 4 and may slide relatively thereon with the exception of the disc 6 which serves as abutment; the other friction element is formed by the discs 7 rigid in rotation with the casing 8 keyed to the shaft of the motor. This assembly of friction discs acts as a clutch or friction device of well known type and may transmit to the worm a torque which is a function of the pressure E applied to the end of the shaft 4 and forcing the discs 5, 7 into contact with a pressure which may vary. The friction device shown is of the multi-disc type but the principle of the invention is applicable to a friction device with two discs or to a cone friction device as commonly employed in industry.

The operation is as follows: a certain pressure being applied at E either by a lever or by a spring, the motor 1 drives the worm 2 through the friction elements 5, 6, 7, 8; driving the wheel 3 in the direction of the arrow. The spindle of said wheel, being subjected to the resisting torque, produces on the worm an axial pressure D which is a function of the transmitted torque and acts contrary to the pressure E to diminish the clamping pressure exerted on the friction discs 5, 7.

It follows that the clamping pressure of the friction discs is at every instant $P=E-D$. It will be seen that by appropriate choice of the materials employed and of the number and size of the friction discs, it is possible to obtain the drive for a value of P which is very small relatively to the reaction D.

The slightest increase in the resisting torque is shown as a great reduction in the engagement pressure which immediately leads to slip of the friction discs.

It should be noted that this use of the axial forces generated in a worm permits the torque limiter to be made very precise in operation and insensitive to variations in the coefficient of friction of the sliding surfaces.

Referring to Fig. 2 it will be seen that the motor 9 by its shaft 10 in bearing 11 which prevents axial movement, drives the friction disc 12 which by friction drives the disc 13 on shaft 14 to which is secured the helical pinion 15 driving helical wheels 16 on shaft 17 supported in bearings 18 and 19 which prevent axial movement.

As in the embodiment of Fig. 1 a resisting torque on shaft 17 applies to pinion 15 an axial pressure D which results in the pressure P engaging the friction discs one against the other being always $P=E-D$.

The explanations given above in reference to the embodiment of Fig. 1 apply equally to the mechanism of Fig. 2.

Referring to Fig. 3 the mechanism shown is applied to a machine assembly on an existing shaft and so that this shaft retains the same alignment, the same speed and the same direction of rotation after interposition of the torque limiter.

This shaft 20 which serves as the driving shaft of the device is rigid with a toothed wheel 21 in one section of the shaft 20 and, independently thereof, a shaft 22 is rigid with worm wheel 23. The shaft 22 and wheel 23 are mounted so that no axial displacement can occur, and the shaft 22 serves as the output shaft to which the resisting torque is applied. It will be seen thus that the application of the device according to the invention to an existing machine does not modify the position and alignment of the shaft 20 which occupies the original position of the shaft 22.

The wheel 21 engages a pinion 24 secured on a shaft 25 rotating in a ball bearing in the deep groove 26 which fixes its longitudinal position. A multiple disc friction device 27 (or a cone clutch or a two-disc clutch) effects frictional connection of the shaft 25 with the worm shaft 28 carryng a worm 29 with helical teeth engaging the wheel 23. The shaft 25 rotates at a higher speed than shaft 20 whereby the dimensions of the friction mechanism may be reduced to a low value.

As in the various constructions described the axial pressure D applied to the pinion is balanced against the pressure E exerted by the bell crank arm 30 pivoting around spindle 31 and applied to the end of the shaft 28 by the action of a weight 32.

The operation of the apparatus is identical with that shown and described in Fig. 2.

The construction described may comprise without modifying the principle of the invention:

*a.* Such dimensions for the gears that when the friction device is in operation without slip the shaft 22 rotates at a different speed from the motor shaft 20,

*b.* The worm wheel 23 may be positioned on the primary shaft 20 and the spur wheel 21 on the secondary shaft 22.

Referring to Fig. 4 110 indicates the frame, 33 indicates in chain dot lines a reel of web, sheet or strip material of which the core or hub is rigid with or connected to the control mechanism. The reel is formed by the winding of a web sheet or strip 35 to which a pull T is applied opposing the winding and intended to ensure close coiling of the layers.

In the embodiment shown the motive power for the winding is supplied by an electric motor 36 which operates the mechanism for example by means of a belt.

The mechanism comprises essentially a worm 37 supported by the ends of the axis of the worm shaft 38, 39 and carrying a friction disc 40 keyed to the shaft 39. The device comprises a second friction disc 41 rigid with the motor shaft 42. The worm 37 engages a worm wheel 43 rigid with the shaft driving the mandrel of the reel 34.

It will be readily seen that by submitting the friction discs 40, 41 to a suitable pressure they may act to limit the transmitted torque as explained above.

It will also be seen that by reason of the transmission of energy from the worm 37 to the worm wheel 43 a reaction D is produced which assuming T is constant is a function of the radius R of the reel.

This reaction tends to separate the driven disc 40 from the driving disc 41 and consequently tends to reduce the torque transmitted.

Moreover the torque to be applied to the reel-carrying shaft 34 being a function of the product $T \times R$ (T constant) the motive torque to be applied to the worm will be a function of art and consequently the friction discs should be applied one to the other with a force varying with the radius of the reel.

This result is obtained by a bell crank articulated at its knee 44 of which one arm 45 acts, in the direction E, on the end of the pivot 38 and the other arm 46 is subjected to the action of a counterweight 47 of which the point of application is regulated by a feeler roller 48 bearing on the face of the reel. The roller 48 and the counterweight 47 are constantly drawn inwardly by the wire 49 and the counterweight 50.

This arrangement permits the counterweight 47 to act with a leverage which varies with the radius R of the coil and to transmit to the friction discs through lever arm 45 a friction acting pressure E which is at every instant a function of the reel radius.

It follows that the pressure of the friction discs one on the other is $P = E - D$; as E and D are a function of the reel radius their difference is also a function of this radius and finally P is also a function of the radius R of the reel which permits constant reeling tension T to be maintained.

If for any reason the coefficient of friction of the friction discs increases (seizing, lubrication failure, heating, etc.) the tension of the material to be reeled also tends to increase, producing an increase in the reaction P which then exerts a correcting action on the drive so that partial independence is obtained of the tension T of the coiling in relation to the coefficient of friction of the friction faces or linings of the friction discs.

Naturally the construction of Fig. 4 is not restricted to the details shown and the constant tension reeling mechanism may also be constructed in the same way as the torque limiters of Figs. 1, 2 and 3 with single friction discs with multiple discs or with cone devices.

According to Fig. 5 the bell crank system on which a counterweight or a spring acts with a leverage varying with the reel radius is arranged so as to permit regulation of the axial pressure E exerted on the worm, which pressure is intended to balance the axial reaction and to produce the engagement pressure.

The bell crank 51, 52, 53 is articulated at 52 by a spindle carried by a bearing 54 movable on an axis perpendicular to the push rod 55 acting against the end of the worm. It will be seen that if by operation on the lever 56 controlling the screw 57, the bearing 54 is slid within the guides 58, 59 rigid with the frame of the apparatus the leverage L of the portion 52—53 of the bell crank is varied. As this operation is without action on the point of application 60 of the counterweight 61 the pressure E varies in the opposite sense to L and it is thus possible to regulate the tension of the reeling even in operation.

In the construction of Fig. 6 the reel 62 in course of winding is subjected to the action of a feeler roller 63 carried by a piston 64 which slides in a guide tube 65 fixed at the base to a column 66. The tube 65 is articulated to the column by a spindle 67 permitting the assembly to tilt for removal of the finished reel. A spring system not shown presses the feeler roller constantly against the surface of the reel.

The tube 65 carries lugs and the piston 64 also carries a lug. These two lugs serve for connection respectively to the sheath and the inner cable of a flexible transmission element 68, which may have any desired configuration and transmits to the carriage 69 and to the counterweight carried thereby, the displacements of the roller 63 and of the piston connected thereto. The displacements of the carriage 69 on the lever 70 may thus be such that the distance of the carriage 69 from the axis of articulation 71 of the bell crank varies as R, that is the radius of the reel as constantly measured by the feeler roller.

As such transmission devices can only operate in one direction, the bell crank 70 is arranged on the slope so that the inner cable is constantly tensioned.

It should be noted that with this arrangement, when the roller is raised its presser means bring it immediately to the position corresponding to the smallest reel radius and that the carriage 69 itself takes the position corresponding to the transmission of the minimum torque to the spindle of the reel.

This arrangement easily permits the feeler roller to be moved and to be installed at the most favourable position.

Fig. 7 shows a construction utilising photo-electric cell device for use as a feeler.

The reel 72 in course of winding is contacted by a spindle 73 rotating in two bearings not shown, fixed to the frame of the machine and carrying two arms 74 and 75 spaced wider than the length of the reel so that these two arms are constantly connected by the spindle 73 which may oscillate while embracing the reel for the whole of its length. The extension element 76 of the arm 75 effects, by a direct connection as shown, or by connecting means of any type, the displacement of the sliding counterweight 77 on the bell crank 78 pivoted at 79, which transmits by its arm 80 axial pressure to the shaft of the worm operating the reeling as described in the foregoing embodiments. Moreover the arm 74 carries an electric lamp in a cylindrical cover 81 to produce a narrow luminous beam directed to a photo-electric cell located in a cover 82 coaxial with the cover 81.

The whole is so arranged that the positions of the counterweight defined by the length R are such that if r is the reel radius there is at every instant the relation $$\frac{R}{r} = \text{constant}$$

The assembly 73—74—75 being supposed immovable it will be seen that when the diameter of the reel increases the material being reeled intercepts the light rays. The photo-electric cell is no longer illuminated and operates a relay 83 which starts the motor 84 and rotates the wheel 85 by means of the worm 86. This rotation displaces the assembly 73—74—75 by means of the crank pin 87, the connecting rod 88 and the joint 89. Movement stops as soon as the assembly 73—74—75 being sufficiently displaced the light rays emitted by 81 again illuminate the photo-cell 82.

The arm 75 in the course of its movement proportional to the diameter of the reel moves the counterweight 77 along the bellcrank 78 articulated at 79, the arm 80 acting as already described on the clutch of the worm of the torque limiter.

A reversing switch 90 permits the motor to be connected either to the relay controlled by the cell or to the feed circuit 91 and thus to secure control of operation of the motor either by the cell or to cause the arms 74 and 75 and the counterweight 77 to move rapidly into the position corresponding to the start of the reeling operation.

This device thus permits the required displacements of the counterweight 77 on its bellcrank 78 to be produced for ensuring according to the invention reeling under constant tension without any material contact of the feeler means risking damage to the surface of the reeled material and without any material element which might inconvenience the operations necessary for access to the reel being produced.

Referring to Fig. 8 an arrangement is shown in which there is coupled to the feeler means a speed varying device for operating the spindle driving the reel at a speed nearly equal to but slightly greater than the desired speed, the friction means only coming into use for effecting correction of the speed and making the tension uniform.

The coiling mechanism is controlled by the shaft 92 carrying a pulley with separable flanges 93, 94 of which the movable flame 94 is controlled by a spring 95 tending to clamp the belt 96 and to force it towards the periphery of the pulley. This belt drives a second pulley with separable flanges 97, 98, rigid with the screw 106.

The flange 98 slides by means of a sleeve 99 on the shaft 100 and this sleeve is pressed on the end 101 of a lever 102 articulated at 103. This lever is itself operated by a connecting rod 104 connected to the counterweight 105 the positions of which are related to and controlled by the diameter of the reel. It will be understood that by judicious choice of the dimensions of the pulleys and of the lever arms, it is possible with a constant speed motor on the shaft 92, to operate the screw 106 and therefrom the mandrel of the reel at a speed which limits slip in the friction device 107 to a very low value.

Naturally in this embodiment of Fig. 8 it is possible to control the ratios of the speeds of the speed reducing device by a simple mechanical connection of the lever 102 to one of the elements of the regulating mechanism in the case where there is employed for measuring the reel dimensions one of the embodiments of Figs. 6 and 7, (for example in the case of Fig. 7 the connection by a connecting rod of the lever 102 to the crank pin 87 or to a special control element).

In the foregoing it has been assumed that in the torque limiting device, the motor spindle 1 of Fig. 1, 10 of Fig. 2, 20 of Fig. 3 and 42 of Fig. 4 are in rotation but if these shafts are regarded as immovable and there is applied to secondary shafts a torque tending to cause them to rotate in the opposite direction to the normal drive it will be seen that the friction device will behave as a brake of which the operation is regulated by the relation $P=E-D$ and that this brake will have the same self-regulating properties as the torque limiter.

This property is very important since it permits the same apparatus to be used for example as or in a reeling apparatus operating under constant tension as well as, by stopping the motor, using it for delivery from the reel under constant tension.

What I claim is:

1. A reeling machine comprising a frame, a shaft mounted in said frame, a reel for winding sheets, bands, webs, threads and the like under constant tension mounted on said shaft, a worm wheel mounted on said shaft, a worm shaft slidably mounted in said frame, a worm mounted on said worm shaft and meshing with said worm wheel, a bell crank mounted at its knee on said frame adjacent one end of said worm shaft, one arm of said bell crank extending horizontally, a counterweight slidably mounted on said horizontal arm, a feeler connected to said counterweight, means urging said feeler against material being wound on said reel, the second arm of said bell crank bearing on said one end of said worm shaft, a motor having a shaft extending adjacent said worm shaft, and a friction clutch interposed between said motor shaft and said worm shaft.

2. A reeling machine as claimed in claim 1 in which said means urging said feeler against material being wound on said reel comprise a pulley mounted on said frame on the opposite side of said reel from said feeler, a wire connected to said feeler and passing over said pulley, and a weight suspended on said wire.

3. In a reeling machine for winding sheets, bands, webs, threads and the like under constant tension on a reel and having a frame, a shaft mounted on said frame, a reel mounted on said shaft, a worm wheel mounted on said shaft, a worm shaft slidably mounted in said frame, a worm mounted on said worm shaft and meshing with said worm wheel, a motor having a shaft extending adjacent said worm shaft and a friction clutch between said worm shaft and said motor shaft having two friction plates one on each shaft, a torque regulating device comprising a bell crank pivoted at its knee on said frame, a counterweight slidably mounted on one of the arms of said bell crank, a feeler connected to said counterweight, means urging said feeler against material being wound on said reel, the other arm of said bell crank bearing on the end of said worm shaft opposite the end on which said clutch is mounted, said counterweight applying a pressure to the end of said worm shaft toward said clutch, said pressure varying with the distance of said counterweight from said knee, said distance varying with the distance of said feeler from said reel shaft, whereby on operation of the motor to wind said reel through said clutch, worm shaft, worm, worm wheel and reel shaft, said pressure exerted by said bell crank arm is greater and opposed in direction to a reaction exerted by said worm wheel on said worm and worm shaft, a resultant force produced by said presusre and said reaction being exerted on said friction clutch in the direction of said motor shaft.

References Cited in the file of this patent
UNITED STATES PATENTS

| Number | Name | Date |
|---|---|---|
| 2,252,419 | Slaughter | Aug. 12, 1941 |
| 2,261,555 | Luehrs | Nov. 4, 1941 |
| 2,271,051 | Treckmann et al. | Jan. 27, 1942 |
| 2,483,751 | Bronander | Oct. 4, 1949 |